United States Patent
Nishie et al.

(10) Patent No.: US 9,306,238 B2
(45) Date of Patent: Apr. 5, 2016

(54) NONAQUEOUS ELECTROLYTE SECONDARY BATTERY AND METHOD FOR PRODUCING NONAQUEOUS ELECTROLYTE SECONDARY BATTERY

(71) Applicant: GS Yuasa International Ltd., Kyoto (JP)

(72) Inventors: Katsushi Nishie, Kyoto (JP); Yudai Kawasoe, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 108 days.

(21) Appl. No.: 14/348,970

(22) PCT Filed: Oct. 10, 2012

(86) PCT No.: PCT/JP2012/006487
§ 371 (c)(1),
(2) Date: Apr. 1, 2014

(87) PCT Pub. No.: WO2013/054511
PCT Pub. Date: Apr. 18, 2013

(65) Prior Publication Data
US 2014/0212747 A1 Jul. 31, 2014

(30) Foreign Application Priority Data
Oct. 11, 2011 (JP) .................................. 2011-224396

(51) Int. Cl.
*H01M 6/04* (2006.01)
*H01M 10/0525* (2010.01)
*H01M 4/505* (2010.01)
*H01M 4/525* (2010.01)
*H01M 10/052* (2010.01)
*H01M 10/0567* (2010.01)
*H01M 10/04* (2006.01)

(52) U.S. Cl.
CPC .......... *H01M 10/0525* (2013.01); *H01M 4/505* (2013.01); *H01M 4/525* (2013.01); *H01M 10/04* (2013.01); *H01M 10/052* (2013.01); *H01M 10/0567* (2013.01); *Y02E 60/122* (2013.01); *Y02P 70/54* (2015.11); *Y02T 10/7011* (2013.01); *Y10T 29/49108* (2015.01)

(58) Field of Classification Search
CPC .......... H01M 10/0525; H01M 10/052; H01M 10/0567; H01M 10/04; H01M 4/505; H01M 4/525; Y02E 60/122; Y10T 29/49108
See application file for complete search history.

(56) References Cited

U.S. PATENT DOCUMENTS

| 6,670,078 B1 | 12/2003 | Sato et al. |
| 7,608,363 B2 * | 10/2009 | Kinoshita ............ H01M 4/131 |
| | | 429/231.3 |
| 8,227,116 B2 | 7/2012 | Kawasaki et al. |
| 8,357,471 B2 | 1/2013 | Utsugi et al. |
| 8,445,144 B2 | 5/2013 | Utsugi et al. |
| 9,048,508 B2 * | 6/2015 | Kato .................. H01M 10/052 |
| 2007/0154815 A1 | 7/2007 | Kawasaki |
| 2010/0119956 A1 | 5/2010 | Ohashi |
| 2012/0308881 A1 | 12/2012 | Tokuda et al. |
| 2013/0040209 A1 | 2/2013 | Mio et al. |
| 2013/0101895 A1 | 4/2013 | Utsugi et al. |
| 2013/0280622 A1 | 10/2013 | Tokuda et al. |

FOREIGN PATENT DOCUMENTS

| JP | 08-078052 | 3/1996 |
| JP | 11-162511 | 6/1999 |
| JP | 2005-135701 | 5/2005 |
| JP | 2005-203342 | 7/2005 |
| JP | 2007-265858 | 10/2007 |
| JP | 2010-135115 | 6/2010 |
| JP | 2010-218982 | 9/2010 |
| JP | 2011-023330 | 2/2011 |
| JP | 2011-187440 | 9/2011 |
| JP | 2012-064573 | 3/2012 |
| WO | 2011/136189 | 11/2011 |

OTHER PUBLICATIONS

Extended European Search Report dated Feb. 16, 2015 issued in the corresponding European patent application No. 12840699.8.
Markus Frasch et al, "Uber Substitutionsreaktionen an 1,3-Dithientan-1,1,3,3-tetraoxid (Disulfen)," Chemische Berichte, vol. 126, No. 2, Feb. 1, 1993, pp. 537-541; Cited in Extended European Search Report.
International Search Report dated Jan. 15, 2013 filed in PCT/JP2012/006487.

* cited by examiner

*Primary Examiner* — Raymond Alejandro
(74) *Attorney, Agent, or Firm* — Rankin, Hill & Clark LLP

(57) ABSTRACT

A nonaqueous electrolyte secondary battery includes a positive electrode, a negative electrode and a nonaqueous electrolyte. The positive electrode includes $Li_xMn_aNi_bCo_cM_dO_2$ ($0<x<1.3$, $0.1<a<0.7$, $0.1<b<0.6$, $0.1<c<0.67$, $0 \leq d<0.1$, $a+b+c+d=1$, and M represents a metal selected from the group consisting of Al, Ti, Mg, Cr, Zn, W, Zr and Nb) as a positive active material. The nonaqueous electrolyte includes a cyclic disulfone compound of the general formula (1) in an amount of 0.1 to 4.0% by mass based on the total mass of the nonaqueous electrolyte.

4 Claims, 1 Drawing Sheet

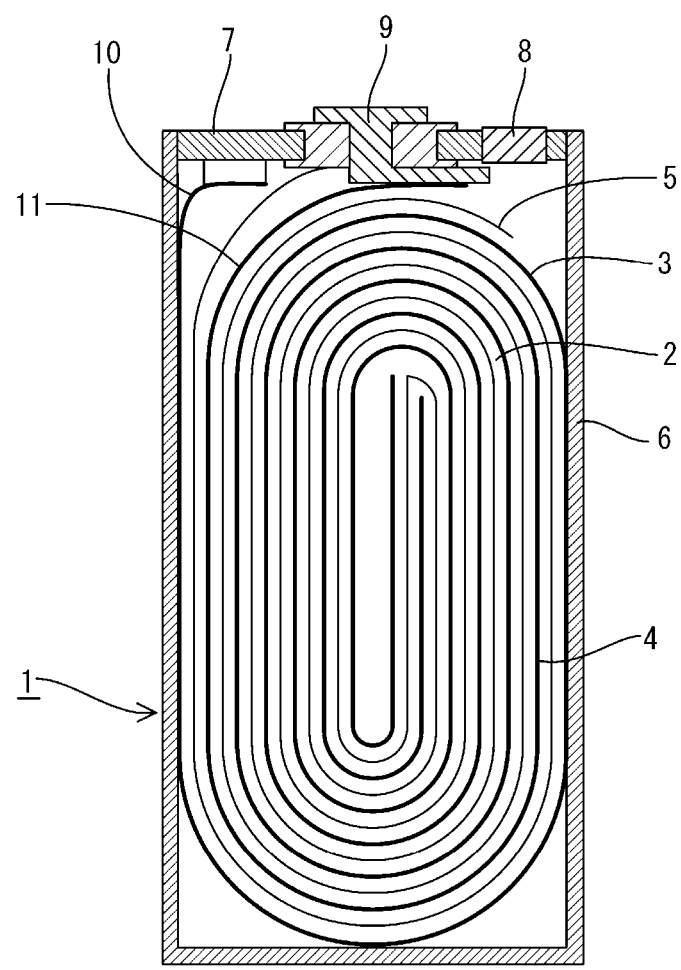

NONAQUEOUS ELECTROLYTE SECONDARY BATTERY AND METHOD FOR PRODUCING NONAQUEOUS ELECTROLYTE SECONDARY BATTERY

TECHNICAL FIELD

The present invention relates to a nonaqueous electrolyte secondary battery and a method for producing a nonaqueous electrolyte secondary battery.

BACKGROUND ART

Nonaqueous electrolyte secondary batteries such as lithium-ion secondary batteries have a high energy density as compared to other secondary batteries such as lead-acid batteries and alkaline secondary batteries, and are therefore widely used as power sources of portable devices such as mobile phones. In recent years, research and development directed to use of a nonaqueous electrolyte secondary battery as a power source of a mobile body such as an electric car is being actively conducted.

While nonaqueous electrolyte secondary batteries such as lithium-ion secondary batteries have a high energy density, they suffer from a degradation in battery performance such as a decrease in discharge capacity and an increase in internal resistance due to repetition of charge-discharge and long-term storage. Such a degradation in battery performance results mainly from a reaction between an electrode plate and a nonaqueous electrolyte, and attempts are made to add various additives to the nonaqueous electrolyte for suppressing a degradation in battery performance. For example, Patent Document 1 describes a compound having a S—O bond as an additive to a nonaqueous electrolyte.

PRIOR ART DOCUMENT

Patent Document

Patent Document 1: JP-A-11-162511

SUMMARY OF THE INVENTION

Problems to be Solved by the Invention

Batteries mounted as power sources of mobile bodies such as electric cars and hybrid cars are used under severe temperature conditions. For example, when the mobile body is used in a cold district or in the winter season, the temperature of the battery may be below the freezing point. When the mobile body is used in the summer season, the temperature of the battery may rise to a high temperature close to 60° C. depending on a location at which the battery is mounted. A battery mounted on a mobile body is required to exhibit battery performance over a wide temperature range. However, in a battery repeatedly charged/discharged under a high-temperature environment and a battery stored under a high-temperature environment for a long period of time, the internal resistance is increased, and input/output performance are degraded with the increase in internal resistance. Particularly, the internal resistance at a low temperature is significantly high as compared to that at normal temperature, and sufficient input/output performance may not be secured when a battery used under a high-temperature environment is used under a low-temperature environment.

Means for Solving the Problems

As a result of extensively conducting studies on various additives to a nonaqueous electrolyte for solving the difficulties described above, it has been found that in a battery using a lithium transition metal oxide including manganese, nickel and cobalt for a positive electrode, an increase in internal resistance at a low temperature in the battery used under a high-temperature environment can be considerably suppressed by adding to the nonaqueous electrolyte a cyclic disulfone compound having a specific structure.

The invention of the present application provides a nonaqueous electrolyte secondary battery including a positive electrode, a negative electrode and a nonaqueous electrolyte, wherein the positive electrode includes $Li_xMn_aNi_bCo_cM_dO_2$ ($0<x<1.3$, $0.1<a<0.7$, $0.1<b<0.6$, $0.1<c<0.67$, $0\leq d<0.1$, $a+b+c+d=1$, and M represents a metal selected from a group consisting of Al, Ti, Mg, Cr, Zn, W, Zr and Nb) as a positive active material, and the nonaqueous electrolyte includes a cyclic disulfone compound of a general formula (1) in an amount of 0.1 to 4.0% by mass based on a total mass of the nonaqueous electrolyte.

[Chemical Formula 1]

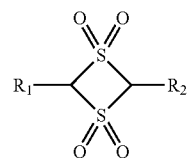

(1)

R1 and R2 in the general formula (1) each represent hydrogen, or an alkyl group having 2 to 4 carbon atoms, optionally including a halogen element.

According to the aforementioned configuration, an increase in internal resistance at a low temperature in the battery used under a high-temperature environment can be suppressed.

In the battery according to the invention of the present application, preferably at least one of 2,4-diethyl-1,3-dithiethane-1,1,3,3-tetraone represented by a following formula (2), 2-(methylethyl)-1,3-dithiethane-1,1,3,3-tetraone represented by a following formula (3) and 2,4-bis(methylethyl)-1,3-dithiethane-1,1,3,3-tetraone represented by a following formula (4) is included as the cyclic disulfone compound.

[Chemical Formula 2]

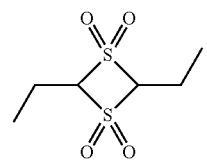

(2)

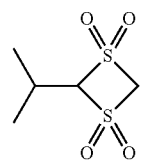

(3)

-continued

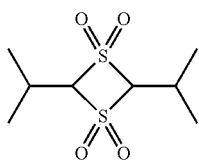

(4)

The aforementioned configuration is preferred because an increase in internal resistance can be further reduced.

In the battery according to the invention of the present application, an average particle size of the positive active material included in the positive electrode is preferably 3 μm or more and 15 μm or less. The aforementioned configuration is preferred because an increase in internal resistance can be further reduced.

The invention of the present application provides a method for producing a nonaqueous electrolyte secondary battery, wherein the positive electrode includes $Li_xMn_aNi_bCo_cM_dO_2$ ($0<x<1.3$, $0.1<a<0.7$, $0.1<b<0.6$, $0.1<c<0.67$, $0≤d<0.1$, $a+b+c+d=1$, and M represents a metal selected from the group consisting of Al, Ti, Mg, Cr, Zn, W, Zr and Nb) as a positive active material, and the nonaqueous electrolyte includes a cyclic disulfone compound of the general formula (1) in an amount of 0.1 to 4.0% by mass based on the total mass of the nonaqueous electrolyte.

BRIEF DESCRIPTION OF THE DRAWING

FIG. 1 is a sectional view of a nonaqueous electrolyte secondary battery of embodiment 1.

MODE FOR CARRYING OUT THE INVENTION

Embodiments of the present invention will be explained in detail below, but the explanation described below presents one example of embodiments of the present invention, and the present invention is not limited to the content of these embodiments as long as not exceeding the spirit thereof.

Embodiment 1 of the present invention will be explained with reference to FIG. 1. A nonaqueous electrolyte secondary battery (hereinafter, referred to as a "secondary battery") shown in FIG. 1 includes a power generating element in which a positive electrode plate with a positive composite, which contains a positive active material, applied to both surfaces of a positive electrode current collector formed of an aluminum foil or an aluminum alloy foil and a negative electrode plate with a negative composite, which contains a negative active material, applied to both surfaces of a negative electrode current collector formed of a copper foil are wound with a separator interposed therebetween, the power generating element being accommodated in a battery case.

The positive electrode plate is connected to a battery lid via a positive electrode lead, the negative electrode plate is connected to a negative electrode terminal provided on the battery lid, and the battery lid is attached by laser welding so as to close an opening of the battery case. The battery ease is provided with a hole, a nonaqueous electrolyte is injected into the battery case through the hole, and after the nonaqueous electrolyte is injected, the hole is sealed to obtain a nonaqueous electrolyte secondary battery.

For the nonaqueous electrolyte of the present invention, a solution of an electrolyte salt in an nonaqueous solvent is used. Examples of the electrolyte salt include $LiCIO_4$, $LiPF_6$, $LiBF_4$, $LiAsF_6$ and $LiCF_3CO_2$, and these electrolyte salts may be used alone or as a mixture of two or more thereof.

$LiPF_6$ is preferred as the electrolyte salt from the viewpoint of conductivity, and a mixture of $LiPF_6$ as a main component of the electrolyte salt and other electrolyte salts such as $LABF_4$ can also be used.

As the nonaqueous solvent of the nonaqueous electrolyte, ethylene carbonate, propylene carbonate, butylene carbonate, trifluoxopropylene carbonate, dimethyl carbonate, diethyl carbonate, ethyl methyl carbonate and the like can be used. Preferably these nonaqueous solvents are mixed and used from the viewpoint of adjusting the conductivity and viscosity of the nonaqueous electrolyte.

The nonaqueous electrolyte of the present invention includes a cyclic disulfone compound of the following general formula (1) in an amount of 0.1 to 4.0% by mass based on the total mass of the nonaqueous electrolyte. Here, R1 and R2 each represent an alkyi group having 2 to 4 carbon atoms, optionally including a halogen element, or hydrogen.

[Chemical Formula 3]

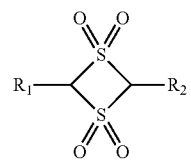

(1)

Specific examples of the compound represented by the general formula (1) include 2-ethyl-1,3-dithiethane-1,1,3,3-tetraone,
2,4-methyl-1,3-dithiethane-1,1,3,3-tetraone,
2,4-diethyl-1,3-dithiethane-1,1,3,3-tetraone,
2-propyl-1,3-dithiethane-1,1,3,3-tetraone,
2,4-dipropyl-1,3-dithiethane-1,1,3,3-tetraone,
2-isopropyl-1,3-dithiethane-1,1,3,3-tetraone,
2,4-diisopropyl-1,3-dithiethane-1,1,3,3-tetraone,
2,4-butyl-1,3-dithiethane1,1,3,3-tetraone and
2,4-dibutyl-1,3-dithiethane-1,1,3,3-tetraone, and among them,
2,4-diethyl-1,3-dithiethane-1,1,3,3-tetraone represented by the following formula (2), 2-(methylethyl)1,3-dithiethane-1,1,3,3-tetraone represented by the following formula (3) and
2,4-bis(methylethyl)-1,3-dithiethane-1,1,3,3-tetraone represented by the following formula (4) are preferably selected. These compounds can be mixed and added to the nonaqueous electrolyte.

[Chemical Formula 4]

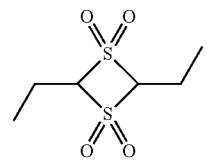

(2)

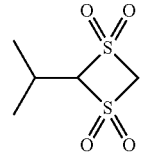

(3)

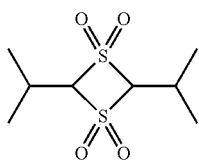

(4)

In the nonaqueous electrolyte secondary battery of the present invention, the positive electrode includes $Li_xMn_aNi_bCo_cM_dO_2$ ($0<x<1.3$, $0.1<a<0.7$, $0.1<b<0.6$, $0.1<c<0.67$, $0\le d<0.1$, $a+b+c+d=1$, and M represents a metal selected from the group consisting of Al, Ti, Mg, Cr, Zn, W, Zr and Nb), and a cyclic disulfone compound of the general formula (1) is added to the nonaqueous electrolyte, whereby an increase in internal resistance at a low temperature in the battery used under a high-temperature environment can be suppressed to improve input/output performance at a low temperature. Details of the mechanism with which an increase in internal resistance is suppressed owing to the above-described configuration are not evident, but it is thought that in the initial stage of use of the battery (use just after production of the battery), the positive active material and the cyclic disulfone compound moderately react with each other to generate a stable thin protective film on the surfaces of particles of the positive active material. It is thought that since this protective film is strong even under a high-temperature environment, generation of a reaction product, which hinders an insertion/desorption reaction of lithium ions, on the surfaces of particles of the positive active material under a high-temperature environment can be suppressed, so that an increase in internal resistance is suppressed.

The transition metal of the positive active material may be catalytically involved in generation of the protective film. Particularly, the generation state of the protective film may vary depending on an abundance ratio of nickel and cobalt included in the positive active material. That is, it is thought that when the abundance ratio of nickel and cobalt (Ni/Co) included in the positive active material is in a range from 1 to 2.5 in terms of a molar ratio, a more suitable protective film is generated, so that an increase in internal resistance can be further suppressed. R1 and R2 in the general formula (1) each represent an alkyl group having 2 to 4 carbon atoms, optionally including a halogen element, or hydrogen. A case where the number of carbon atoms is 1 is not preferred because the cyclic disulfone compound is hard to be dissolved in the nonaqueous electrolyte, and a case where the number of carbon atoms is 5 or more is not preferred because synthesis is difficult.

The amount of the cyclic disulfone compound of the general formula (1) is 4.0% by mass or less based on the total mass of the nonaqueous electrolyte. When the amount of the cyclic disulfone compound is more than 4.0% by mass, the cyclic disulfone compound and the positive active material excessively react with each other, so that the protective film is excessively thick, leading to an increase in internal resistance in the initial stage of use of the battery, and the amount of gas generated in the reaction with the positive active material is increased under a high-temperature environment. On the other hand, when the amount of the cyclic disulfone compound is excessively small, the reaction with the positive active material is insufficient, so that a strong protective film cannot be generated. Therefore, the amount of the cyclic disulfone compound is preferably 0.1% by mass or more based on the total mass of the nonaqueous electrolyte. For generating a proper protective film on the surfaces of particles of the positive active material by a reaction of the cyclic disulfone compound and the positive active material, the amount of the cyclic disulfone compound based on the total mass of the nonaqueous electrolyte is preferably 0.1% by mass or more and 4.0% by mass or less, more preferably 0.2% by mass or more and 2.0% by mass or less.

In addition to the compound described above, carbonates such as vinylene carbonate, methyl vinylene carbonate, monofluoroethylene carbonate and difluoroethylene carbonate can be added alone or as a mixture of two or more thereof to the nonaqueous electrolyte for the purpose of improving cycle life performance and safety of the battery.

For the positive active material of the positive electrode plate in the nonaqueous electrolyte secondary battery of the present invention, $Li_xMn_aNi_bCo_cM_dO_2$ ($0<x<1.3$, $0.1<a<0.7$, $0.1<b<0.8$, $0.1<c<0.67$, $0\le d<0.1$, $a+b+c+d=1$, and M represents a metal selected from the group consisting of Al, Ti, Mg, Cr, Zn, W, Zr and Nb) is used. By adjusting the average particle size of the positive active material to 3 μm to 15 μm, the cyclic disulfone compound and the positive active material can be allowed to properly react with each other.

In addition to the positive active material, a conducting agent, a binder and so on can be contained in a positive electrode plate 3. As the conducting agent, acetylene black, carbon black, graphite, and the like may be used. As the binder, polyvinylidene fluoride, a vinylidene fluoride-hexafluoropropylene copolymer, a styrene-butadiene rubber, polyacrylonitrile, and the like may be used alone or as a mixture of two or more thereof.

As the negative active material of the negative electrode plate in the nonaqueous electrolyte secondary battery of the present invention, a carbon material an alloy-based compound of Al, Si, Pb, Sn, Zn, Cd or the like and lithium, metal lithium, and a metal oxide represented by the general formula $M4O_x$ (where M4 represents at least one element selected from W, Mo, Si, Cu and Sn, and $0\le z\le 2$), or the like may be used. Among them, a carbon material is preferred, and as the carbon material, graphite, hardly graphitizable carbon, easily graphitizable carbon or a mixture thereof may be used. A binder such as polyvinylidene fluoride or a styrene-butadiene rubber can be added to the negative electrode plate as in the case of the positive electrode plate.

A separator 5 may be one that can isolate the positive electrode plate and the negative electrode plate from each other, and a nonwoven fabric, a synthetic resin microporous film, or the like may be used. Particularly a polyolefin-based microporous film formed of polyethylene and polypropylene, a heat-resistant resin including an araraid layer on the surface of the polyolefin-based microporous film, or the like may be used.

EXAMPLES

A secondary battery shown in FIG. 1 was produced in the following manner.

1. Preparation of Positive Active Material of Example 1

Using manganese sulfate hydrate, nickel sulfate hydrate and cobalt sulfate hydrate as raw materials, a nickel-cobalt-manganese coprecipitation precursor was obtained by a coprecipitation method, and a predetermined amount of lithium hydroxide and the nickel-cobalt-manganese coprecipitation precursor were then mixed. The mixture was filled into an alumina bowl, and fired in an electric furnace to prepare a positive active material $LiNi_{0.165}Co_{0.67}Mn_{0.165}O_2$ having an average particle size of 6 μm.

By controlling the temperature, the time, and the like during firing and classifying particles, a positive active material having a predetermined average particle size can be prepared. Generally by elevating the firing temperature, a positive active material having a large average particle size can be prepared. On the other hand, by lowering the firing temperature, a positive active material having a small average particle size can be prepared.

The average particle size of the positive active material is a particle size at a cumulative degree of 50% ($D_{50}$) in the volume standard particle size distribution. For measurement of the particle size distribution, a laser diffraction/scattering type particle size distribution measurement apparatus (SALD-2000J manufactured by Shimadzu Corporation) was used. In preparation for measurement, X and Y axes in a laser section of the measurement apparatus were adjusted to perform centering of a detector. The positive active material prepared as described above and an anionic surfactant containing sodium linear alkylbenzene sulfonate as a main component were sufficiently mixed, and ion-exchange water was then added to prepare a measurement sample. In measurement of the measurement material, blank measurement was performed with only a dispersion solvent (water in this Example) circulated to a measurement section, thereby acquiring background data. Next, the measurement material was put in the measurement section of the measurement apparatus, and ultrasonic irradiation was performed in the measurement section for 15 minutes. After ultrasonic irradiation was performed, the particle size of the measurement material was measured twice, and the average value thereof was acquired as a measurement result. As the measurement result, a particle size distribution histogram, and the values of $D_{10}$, $D_{50}$ and $D_{90}$ ($D_{10}$, $D_{50}$ and $D_{90}$ were particle sizes at which the cumulative volumes in the particle size distribution of secondary particles were 10%, 50% and 90%, respectively) were acquired.

2. Preparation of Secondary Battery of Example 1

(1) Production of Positive Electrode Plate $LiNi_{0.165}Co_{0.67}Mn_{0.165}O_2$ as a positive active material, acetylene black as a conductive additive and polyvinylidene fluoride as a binder were mixed such that the ratios of the positive active material, the conductive assistant and the binder were 90% by mass, 5% by mass and 5% by mass, respectively. An appropriate amount of NMP (N-methylpyrrolidone) was added to the mixture to prepare a positive composite paste. The positive composite paste was applied to both surfaces of an aluminum foil having a thickness of 20 μm, and dried to prepare a positive electrode plate. The positive electrode plate was provided with an area where the positive composite was not applied and the aluminum foil was exposed, and an area where the aluminum foil was exposed and a positive electrode lead were attached to each other.

(2) Production of Negative Electrode Plate

Hardly graphitizable carbon as a negative active material and polyvinylidene fluoride as a binder were mixed such that the ratios of the negative active material and the binder were 90% by mass and 10% by mass, respectively, and NMP was added to the mixture to prepare a negative composite paste. The negative composite paste was applied to both surfaces of a copper foil having a thickness of 15 μm, and dried to prepare a negative electrode plate. The negative electrode plate was provided with an area where the negative composite was not applied and the copper foil was exposed, and an area where the copper foil was exposed and a negative electrode lead were attached to each other.

(3) Preparation of Unfilled Secondary Battery

A separator formed of a polyethylene mieroporous film was interposed between the positive electrode plate and the negative electrode plate, and the positive electrode plate and the negative electrode plate were wound to prepare a power generating element. The power generating element was accommodated in a battery case through an opening of the battery case. The positive electrode lead was attached to the battery lid. The negative electrode lead was attached to the negative electrode terminal. The battery case and the battery lid were then attached to each other by laser welding with the battery lid fitted in the opening of the battery case, thereby preparing a secondary battery in an unfilled state where the battery case is not filled with the nonaqueous electrolyte.

(4) Preparation And Filling of Nonaqueous Electrolyte

A nonaqueous electrolyte was prepared by dissolving $LiPF_6$ at a concentration of 1 mol/L in a mixed solvent of ethylene carbonate (EC):dimethyl carbonate (DMC):ethyl methyl carbonate (EMC)=3:2:5 (volume ratio), and adding 2,4-diethyl-1,3-dithiethane-1,1,3,3-tetraone such that the addition amount of the cyclic sulfone compound was 1.0% by mass based on the total mass of the nonaqueous electrolyte. The nonaqueous electrolyte was filled into the battery case through an electrolyte solution filling port provided at the side surface of the battery case, and the electrolyte solution filling port was sealed with a cap to prepare a secondary battery of Example 1.

3. Preparation of Secondary Batteries of Example 2 To 5 and Comparative Example 1

Batteries of Examples 2 to 5 and Comparative Example 1 were prepared in the same manner as in the case of the battery of Example 1 except that the positive active material $LiNi_{0.165}Co_{0.67}Mn_{0.165}O_2$ included in the positive electrode in Example 1 was changed to $LiNi_{0.33}Co_{0.33}Mn_{0.33}O_2$, $LiNi_{0.33}Co_{0.33}Mn_{0.33}Zr_{0.01}O_2$, $Li_{0.45}Co_{0.1}MnO_{0.45}O_2$, $LiNi_{0.5}Co_{0.2}Mn_{0.3}O_2$ and $LiMn_2O_4$, respectively.

4. Preparation of Secondary Batteries of Example 6 to 10 and Comparative Examples 2 and 3

Batteries of Examples 6 to 10 and Comparative Examples 2 and 3 were prepared in the same manner as in the case of the battery of Example 1 except that the addition amount of 2,4-diethyl-1,3-dithiethane-1,1,3,3-tetraone in Example 1 was changed to 0.1% by mass, 0.2% by mass, 0.5% by mass, 2.0% by mass, 4.0% by mass, 0.0% by mass and 5.0% by mass, respectively.

5. Preparation of Secondary Batteries of Example 11 to 14 and Comparative Example 4

Batteries of Examples 11 to 14 and Comparative Example 4 were prepared in the same manner as in the case of the battery of Example 1 except that 2,4-diethyl-1,3-dithiethane-1,1,3,3-tetraone in Example 1 was changed to
2-(methylethyl)-1,3-dithiethane-1,1,3,3-tetraone,
2,4-bis(methylethyl)-1,3-dithiethane-1,1,3,3-tetraone,
2-butyl-1,3-dithiethane-1,1,3,3-tetraone,
2,4-bis(butyl)-1,3-dithiethane-1,1,3,3-tetraone and
2,4-dimethyl-1,3-dithiethane-1,1,3,3-tetraone, respectively.

6. Preparation of Secondary Batteries of Examples 15 to 22

Batteries of Examples 15 to 22 were prepared in the same manner as in the case of the battery of Example 1 except that the positive active material $LiNi_{0.165}Co_{0.67}Mn_{0.165}O_2$ (average particle size: 6 μm) included in the positive electrode in Example 1 was changed to $LiNi_{0.33}Co_{0.33}Mn_{0.33}O_2$ (average particle size: 2 μm, 3 μm, 4 μm., 12 μm, 15 μm and 16 μm), $LiNi_{0.165}Co_{0.67}Mn_{0.165}O_2$ (average particle size: 2 μm) and $LiNi_{0.3}Co_{0.2}Mn0_{0.3}O_2$ (average particle size 2 μm), respectively.

7. Evaluation Test (1) Initial Capacity Confirmation Test

Initial capacity confirmation tests were conducted under the following charge-discharge conditions using the batteries of Examples 1 to 22 and Comparative Examples 1 to 4. Charge was performed for 3 hours under the charge condition, of constant current charge at 450 mA up to a charge voltage of 4.2 V followed by constant voltage charge at 4.2 V at 25° C. Next, constant current discharge at 450 mA to an end-of-discharge voltage of 2.5 V was performed, and this discharge capacity was defined as an "initial capacity".

(2) 60° C. Cycle Life Test

60° C. cycle life tests were conducted under the following conditions for the respective batteries after the initial discharge capacity measurement. A cycle was repeated 2000 times, the cycle including performing charge for 30 minutes under the charge condition of constant current charge at 900 mA up to a charge voltage of 4.0 V followed by constant voltage charge at 4.0 V at 60° C., and then performing constant current discharge at 900 mA to an end-of-discharge voltage of 3.0 V at, 6(FC. Charge and discharge were each followed by quiescence at 60° C. for 10 minutes. The battery which had undergone 2000 cycles was charged and discharged under the same conditions as those for the initial capacity conformation test. The charge voltage of 4.0 V and the end-of-discharge voltage of 8.0 V in the 60° C. cycle life test are voltages corresponding to 80% (SOC 80%) and 20% (SOC 20%), respectively, when the capacity from the end-of-discharge voltage of 2.5 V to the charge voltage of 4.2 V in the initial capacity confirmation test is fractionated in percentage.

(3) Calculation of Internal Resistance at Low Temperature

Before and after the 60° C. cycle life test, charge was performed, for 3 hours under the charge condition of constant, current charge at 450 mA up to a charge voltage of 3.7 V followed by constant voltage charge at 3.7 V at 25° C., so that the charge state of the battery was set to SOC 50%. A voltage (E1) when performing discharge at 90 mA (I1) for 10 seconds after holding the battery at −20° C. for 5 hours in the state of SOC 50%, and a voltage (E2) when subsequently performing discharge at 225 mA (I2) for 10 seconds were each measured. Using the discharge current values I1 and I2 and the measured voltages E1 and E2, a resistance value (Rx) at −20° C. was calculated in accordance with the following equation. A resistance value increase ratio at −20° C. before the 60° C. cycle life test to the resistance value at −20° C. after the 60° C. cycle life test was calculated.

$$Rx=|(E1-E2)/\text{discharge current}(I1-I2)|$$

6. Discussions

−20° C. resistance values and resistance value increase ratios before and after the 60° C. cycle life test in Examples 1 to 14 and Comparative Examples 1 to 4 are shown in Table 1. In the batteries using $LiNi_{0.165}Co_{0.67}Mn_{0.165}O_2$, $LiNi_{0.33}Co_{0.33}Mn_{0.33}O_2$, $LiNi_{0.45}Co_{0.1}Mn_{0.45}O_2$ and $LiNi_{0.5}Co_{0.2}Mn_{0.3}O_2$ for the positive active material (batteries of Examples 1 to 5), satisfactory results were obtained with the resistance value increase ratio being lower than 30%. On the other hand, in the battery using $LiMn_2O_4$ for the positive active material (battery of Comparative Example 1), the resistance value increase ratio was higher than 30%. The reason for this is not evident, but it is thought that in the positive active material groups used in the batteries of Examples 1 to 5, the positive active material and the cyclic disulfone compound moderately reacted with each other due to the interaction of transition metals included in the positive active material, so that a stable thin protective film was generated on the surfaces of particles of the positive active material. On the other hand, it is thought that the positive active material group used in the battery of Comparative Example 1 excessively reacted with the cyclic disulfone compound, so that an unstable film was generated on the surfaces of particles of the positive active material. In the batteries with the abundance ratio of nickel and cobalt (Ni/Co) being in a range from 1 to 2.5 in terms of a molar ratio (Examples 2 and 5), the resistance value increase ratio could be further suppressed. This is thought to be because the generation state of the protective film varies depending on an abundance ratio of nickel and cobalt.

In the batteries with 2,4-diethyl-1,3-dithiethane-1,1,3,3-tetraone added as a cyclic disulfone compound in an amount of 0.1 to 4.0% by mass based on the total mass of the non-aqueous electrolyte (Examples 6 to 10), satisfactory results were obtained with the resistance value increase ratio being lower than 30%. Particularly, in the batteries with 2,4-diethyl-1,3-dithiethane-1,1,3,3-tetraone added in an amount of 0.2 to 2.0% by mass (Examples 8 to 10), more satisfactory results were obtained with the resistance value increase ratio being lower than 20%. On the other hand, the batteries with 2,4-diethyl-1,3-dithiethane-1,1,3,3-tetraone added in an amount of 0% by mass or 5.0% by mass (Comparative Examples 2 to 3), the resistance value increase ratio was higher than 30%. This is thought to be because when the addition amount is excessively small, the reaction with the positive active material is insufficient, so that a strong protective film cannot be generated. It is thought that when the addition amount is excessively large, the reaction with the positive active material is excessive and the protective film is thus excessively thick, and therefore the increase ratio is increased.

TABLE 1

| | Positive active material | Cyclic disulfone compound | Added amount of cyclic disulfone compound (% by mass) | −20° C. resistance value (mΩ) before test | −20° C. resistance value (mΩ) after test | −20° C. resistance value increase ratio (%) |
|---|---|---|---|---|---|---|
| Comparative Example 1 | $LiMn_2O_4$ | 2,4-diethyl-1,3-dithiethane-1,1,3,3-tetraone | 1.0 | 582 | 822 | 41 |
| Example 1 | $LiNi_{0.165}Co_{0.67}Mn_{0.165}O_2$ | 2,4-diethyl-1,3-dithiethane-1,1,3,3-tetraone | 1.0 | 463 | 534 | 15 |
| Example 2 | $LiNi_{0.33}Co_{0.33}Mn_{0.33}O_2$ | 2,4-diethyl-1,3-dithiethane-1,1,3,3-tetraone | 1.0 | 544 | 607 | 12 |
| Example 3 | $LiNi_{0.33}Co_{0.33}Mn_{0.33}Zr_{0.01}O_2$ | 2,4-diethyl-1,3-dithiethane-1,1,3,3-tetraone | 1.0 | 554 | 612 | 10 |
| Example 4 | $LiNi_{0.45}Co_{0.1}Mn_{0.45}O_2$ | 2,4-diethyl-1,3-dithiethane-1,1,3,3-tetraone | 1.0 | 610 | 694 | 14 |
| Example 5 | $LiNi_{0.50}Co_{0.2}Mn_{0.30}O_2$ | 2,4-diethyl-1,3-dithiethane-1,1,3,3-tetraone | 1.0 | 625 | 700 | 12 |
| Comparative Example 2 | $LiNi_{0.165}Co_{0.67}Mn_{0.165}O_2$ | None | — | 481 | 753 | 57 |
| Example 6 | $LiNi_{0.165}Co_{0.67}Mn_{0.165}O_2$ | 2,4-diethyl-1,3-dithiethane-1,1,3,3-tetraone | 0.1 | 475 | 613 | 29 |
| Example 7 | $LiNi_{0.165}Co_{0.67}Mn_{0.165}O_2$ | 2,4-diethyl-1,3-dithiethane-1,1,3,3-tetraone | 0.2 | 472 | 551 | 17 |
| Example 8 | $LiNi_{0.165}Co_{0.67}Mn_{0.165}O_2$ | 2,4-diethyl-1,3-dithiethane-1,1,3,3-tetraone | 0.5 | 452 | 494 | 9 |
| Example 9 | $LiNi_{0.165}Co_{0.67}Mn_{0.165}O_2$ | 2,4-diethyl-1,3-dithiethane-1,1,3,3-tetraone | 2.0 | 480 | 552 | 15 |
| Example 10 | $LiNi_{0.165}Co_{0.67}Mn_{0.165}O_2$ | 2,4-diethyl-1,3-dithiethane-1,1,3,3-tetraone | 4.0 | 524 | 667 | 27 |
| Comparative Example 3 | $LiNi_{0.165}Co_{0.67}Mn_{0.165}O_2$ | 2,4-diethyl-1,3-dithiethane-1,1,3,3-tetraone | 5.0 | 588 | 823 | 40 |
| Comparative Example 4 | $LiNi_{0.165}Co_{0.67}Mn_{0.165}O_2$ | 2,4-dimethyl-1,3-dithiethane-1,1,3,3-tetraone | 1.0 | 482 | 719 | 49 |
| Example 11 | $LiNi_{0.165}Co_{0.67}Mn_{0.165}O_2$ | 2-(methylethyl)-1,3-dithiethane-1,1,3,3-tetraone | 1.0 | 463 | 520 | 12 |
| Example 12 | $LiNi_{0.165}Co_{0.67}Mn_{0.165}O_2$ | 2,4-bis(methylethyl)-1,3-dithiethane-1,1,3,3-tetraone | 1.0 | 479 | 545 | 14 |
| Example 13 | $LiNi_{0.165}Co_{0.67}Mn_{0.165}O_2$ | 2-butyl-1,3-dithiethane-1,1,3,3-tetraone | 1.0 | 471 | 536 | 14 |
| Example 14 | $LiNi_{0.165}Co_{0.67}Mn_{0.165}O_2$ | 2,4-bis(butyl)-1,3-dithiethane-1,1,3,3-tetraone | 1.0 | 475 | 555 | 17 |

In the batteries with 2-(methylethyl)-1,3-dithiethane-1,1,3,3-tetraone,
2,4-bis(methylethyl)-1,3-dithiethane-1,1,3,3-tetraone,
2-butyl-1,3-dithiethane-1,1,3,3-tetraone or
2,4-bis(butyl)-1,3-dithiethane-1,1,3,3-tetraone added in an amount of 1.0% by mass based on the total mass of nonaqueous electrolyte as a cyclic disulfone compound of the general formula (1) where R1 and R2 each represent hydrogen or an alkyl group having 2 to 4 carbon atoms, optionally including a halogen element (Examples 11 to 14), satisfactory results comparable to those in Example 1 were obtained. On the other hand, in the battery with a cyclic disulfone compound (2,4-dimethyl-1,3-dithiethane-1,1,3,3-tetraone) added as a cyclic disulfone compound, where R1 and R2 each represent a methyl group, in an amount of 1.0% by mass based on the total mass of the nonaqueous electrolyte (Comparative Example 4), the increase ratio was higher than 30%. This is thought to be because when a cyclic disulfone compound where R1 and R2 each represent a methyl group is used, the reaction with the positive active material is insufficient, so that a strong protective film cannot be generated.

−20° C. resistance values and resistance value increase ratios before and after the 60° C. cycle life test in Examples 15 to 22 are shown in Table 2. In Examples 15 to 22, satisfactory results were obtained with the resistance value increase ratio being lower than 30%. Particularly, in the batteries using $LiMn_{0.33}O_{0.33} Mn_{0.33}O_2$ (average particle size: 3 μm to 15 μm) (Examples 16 to 19) for the positive active material, more satisfactory results were obtained with the resistance value increase ratio being lower than 20%. On the other hand, in the batteries using $LiNi_{0.33}Co_{0.33}Mn_{0.33}O_2$ (average particle size: 2 μm and 16 μm), $LiNi_{0.165}Co_{0.67}Mn_{0.165}O_2$ (average particle size: 2 μm) and $LiNi_{0.5}Co_{0.2}Mn_{0.3}O_2$ (average particle size: 2 μm) for the positive active material (Examples 15 and 20 to 22), satisfactory results were obtained with the resistance value increase ratio being lower than 30%, but the resistance value increase ratio was higher than 20%. This is thought to be because when the average particle size of the positive active material increases, the reaction of the cyclic disulfone compound with the positive active material excessively proceeds, so that the protective film generated on the surfaces of particles of the active material is excessively thick, leading to a slight increase in resistance value increase ratio. It is thought that when the average particle size decreases, the positive active material and the cyclic disulfone compound rapidly reacts with each other, and the protective film generated within the battery accumulates between the positive and negative electrodes, so that the substantial facing area of the positive and negative electrodes is decreased, leading to a slight increase in resistance value increase ratio.

TABLE 2

| | Positive active material | Average particle size of positive active material (μm) | −20° C. resistance value (mΩ) before test | −20° C. resistance value (mΩ) after test | −20° C. resistance value increase ratio (%) |
|---|---|---|---|---|---|
| Example 15 | $LiNi_{0.33}Co_{0.33}Mn_{0.33}O_2$ | 2.0 | 492 | 631 | 28 |
| Example 16 | $LiNi_{0.33}Co_{0.33}Mn_{0.33}O_2$ | 3.0 | 493 | 601 | 22 |
| Example 17 | $LiNi_{0.33}Co_{0.33}Mn_{0.33}O_2$ | 4.0 | 501 | 593 | 18 |
| Example 18 | $LiNi_{0.33}Co_{0.33}Mn_{0.33}O_2$ | 12.0 | 553 | 624 | 13 |
| Example 19 | $LiNi_{0.33}Co_{0.33}Mn_{0.33}O_2$ | 15.0 | 550 | 655 | 19 |
| Example 20 | $LiNi_{0.33}Co_{0.33}Mn_{0.33}O_2$ | 16.0 | 556 | 717 | 29 |
| Example 21 | $LiNi_{0.165}Co_{0.67}Mn_{0.165}O_2$ | 2.0 | 421 | 536 | 27 |
| Example 22 | $LiNi_{0.30}Co_{0.20}Mn_{0.30}O_2$ | 2.0 | 580 | 742 | 28 |

From the results described above, it has been found that by providing a nonaqueous electrolyte secondary battery including a positive electrode, a negative electrode and a nonaqueous electrolyte, wherein the positive electrode includes $Li_xMn_aNi_bCo_cM_dO_2$ ($0<x<1.3$, $0.1<a<0.7$, $0.1<b<0.6$, $0.1<c<0.67$, $0\le d<0.1$, $a+b+c+d=1$, and M represents a metal selected from the group consisting of Al, Ti, Mg, Cr, Zn, W, Zr and Mb) as a positive active material, and the nonaqueous electrolyte includes a cyclic disulfone compound of the general formula (1), where R1 and R2 each represent hydrogen, or an alkyl group having 2 to 4 carbon atoms, optionally including a halogen element, in an amount of 0.1 to 4.0% by mass based on the total mass of the nonaqueous electrolyte, an increase in internal resistance at a low temperature in the battery used under a high-temperature environment can be suppressed. Further, it has been found that when the average particle size of the positive active material is 3 μm or more and 15 μm or less, the internal resistance increase ratio can be considerably reduced.

DESCRIPTION OF REFERENCE SIGNS

1 Nonaqueous electrolyte secondary battery
3 Positive electrode plate (positive electrode)
4 Negative electrode plate (negative electrode)
5 Separator
6 Battery case
7 Battery lid
10 Positive electrode lead
11 Negative electrode lead

The invention claimed is:

1. A nonaqueous electrolyte secondary battery comprising:
a positive electrode;
a negative electrode; and
a nonaqueous electrolyte,
wherein the positive electrode includes $Li_xMn_aNi_bCo_cM_dO_2$, wherein $0<x<1.3$, $0.1<a<0.7$, $0.1<b<0.6$, $0.1<c<0.67$, $0\le d<0.1$, $a+b+c+d=1$, and M represents a metal selected from a group consisting of Al, Ti, Mg, Cr, Zn, W, Zr and Nb as a positive active material, and
the nonaqueous electrolyte includes a cyclic disulfone compound of a following general formula (1) in an amount of 0.1 to 4.0% by mass based on a total mass of the nonaqueous electrolyte:

[Chemical Formula 1]

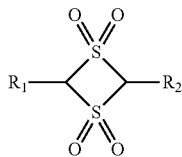

(1)

wherein R1 and R2 each represent hydrogen, or an alkyl group having 2 to 4 carbon atoms, optionally including a halogen element.

2. The nonaqueous electrolyte secondary battery according to claim 1, wherein at least one of 2,4-diethyl-1,3-dithiethane-1,1,3,3-tetraone represented by the following formula (2), 2-(methylethyl)-1,3-dithiethane-1,1,3,3-tetraone represented by the following formula (3) and 2,4-bis(methylethyl)-1,3-dithiethane-1,1,3,3-tetraone represented by the following formula (4) is included as the cyclic disulfone compound

[Chemical Formula 2]

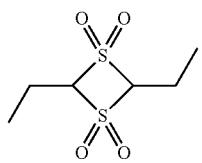

(2)

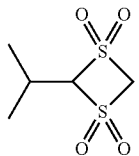

(3)

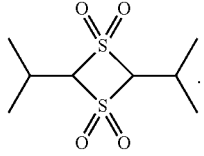

(4)

3. The nonaqueous electrolyte secondary battery according to claim 1, wherein the average particle size of the positive active material is 3 μm or more and 15 μm or less.

4. A method for producing the nonaqueous electrolyte secondary battery according to claim 1.

* * * * *